US012263984B2

(12) United States Patent
Bowden et al.

(10) Patent No.: US 12,263,984 B2
(45) Date of Patent: Apr. 1, 2025

(54) LABEL APPLYING SYSTEM

(71) Applicant: ID Technology LLC, Ft. Worth, TX (US)

(72) Inventors: Mark Bowden, Nokomis, FL (US); Sébastien Hétu, Québec (CA); Maxime Demers, Québec (CA)

(73) Assignee: ID TECHNOLOGY LLC, Ft. Worth, TX (US)

( * ) Notice: Subject to any disclaimer, the term of this patent is extended or adjusted under 35 U.S.C. 154(b) by 46 days.

(21) Appl. No.: 18/464,729

(22) Filed: Sep. 11, 2023

(65) Prior Publication Data

US 2024/0109681 A1 Apr. 4, 2024

Related U.S. Application Data

(60) Provisional application No. 63/412,022, filed on Sep. 30, 2022.

(51) Int. Cl.
*B65C 9/36* (2006.01)
*B65C 1/02* (2006.01)

(52) U.S. Cl.
CPC ................ *B65C 9/36* (2013.01); *B65C 1/021* (2013.01)

(58) Field of Classification Search
CPC .................................. B65C 1/021; B65C 9/36
See application file for complete search history.

(56) References Cited

U.S. PATENT DOCUMENTS

| | | | |
|---|---|---|---|
| 6,006,808 A | 12/1999 | Ewert | |
| 6,817,397 B2 | 11/2004 | Bixen | |
| 7,354,498 B2 | 4/2008 | Jenkins | |
| 10,934,047 B1 | 3/2021 | Daboub | |
| 11,225,350 B1 | 1/2022 | Koch | |
| 2024/0109681 A1 * | 4/2024 | Bowden | B65C 9/36 |

* cited by examiner

*Primary Examiner* — Sonya M Sengupta
(74) *Attorney, Agent, or Firm* — THOMPSON HINE LLP

(57) ABSTRACT

A label applying system includes a conveyance path for moving an item in a conveyance direction, and a label applying arm, including a free end with an associated tamp pad, the label applying arm linearly movable toward the conveyance path for applying a label to the moving item on the conveyance path. A connection between the tamp pad and the label applying arm comprises at least one rubber damper between the tamp pad and the label applying arm for enabling pivot of the tamp pad and absorbing impact force when the tamp pad contacts the moving item to apply the label to the moving item.

20 Claims, 5 Drawing Sheets

LABEL APPLYING SYSTEM

TECHNICAL FIELD

The present application relates generally to label applying and, more particularly, to a label applying system for labeling the top or side of items conveyed along a path.

BACKGROUND

Material handling systems are used in many different industries and often include complex packaging and conveyor systems that convey items, such as cases (boxes), quickly from one place to the next within a facility or multiple facilities. Labeling is often necessary to convey information about the cases so that the cases can be identified, categorized, and/or properly routed, among other reasons. One type of known system uses an overhead label applier.

In one type of overhead label applier, the applier includes an applying arm with a tamp pad at its lower end. After the face of the tamp pad receives a label, the label applying arm is driven linearly downward to move the label into contact with the top of an item moving along a conveyance path. Variations of such label appliers with flexing tamp pads are known.

For example, U.S. Pat. No. 6,006,808 discloses a tamp pad that is spring mounted to a mounting plate to allow the tamp pad to pivot. U.S. Pat. No. 6,817,397 discloses a label applicator tamp pad with a spring mount that permits the tamp pad to move from an orientation perpendicular to the direction of movement of the tamp arm to an orientation inclined relative to the direction of movement. The use of springs in such systems is disadvantageous because the springs are subject to compressing excessively at tamp contact, which results in slow tamp reaction in systems where the force of the tamping action against an item is used as a control to trigger retraction of the tamp arm. Even if such spring systems were implemented with stiff springs, such stiff springs would be heavy, increasing weight at the end of the tamp arm, which would also adversely affect tamp control. Stiff springs also do not readily bend. Moreover, such spring systems do not effectively absorb energy of tamp impact because springs are made to store energy during compression and release the energy during extension. To avoid oscillation after tamping, the springs in such systems need fasteners, brackets and/or moving parts. This results in higher parts quantity & higher weight, again adversely affecting tamp control.

It would be desirable to provide a label applying system that provides ability of the tamp pad to pivot, while overcoming one or more of the above-noted problems.

SUMMARY

In one aspect, a label applying system includes a conveyance path for moving items in a conveyance direction and a label applying arm movable in one of a vertical direction or a horizontal direction relative to the conveyance path for applying labels to moving items, where a rubber damper connects a tamp pad to the arm.

In another aspect, a label applying system includes a conveyance path for moving an item in a conveyance direction, and a label applying arm, including a free end with an associated tamp pad, the label applying arm linearly movable toward the conveyance path for applying a label to the moving item on the conveyance path. A connection between the tamp pad and the label applying arm comprises at least one rubber damper between the tamp pad and the label applying arm for enabling pivot of the tamp pad and absorbing impact force when the tamp pad contacts the moving item to apply the label to the moving item.

In a further aspect, a label applying system includes a label applying arm, including a free end with an associated tamp pad, the label applying arm having a length and being linearly movable along in a direction along the length for applying labels. A connection between the tamp pad and the label applying arm comprises at least one rubber damper between the tamp pad and the label applying arm for enabling pivot of the tamp pad when the tamp pad contacts the moving item to apply the label to the moving item.

The details of one or more embodiments are set forth in the accompanying drawings and the description below. Other features, objects, and advantages will be apparent from the description and drawings, and from the claims.

DETAILED DESCRIPTION

Figure 1:
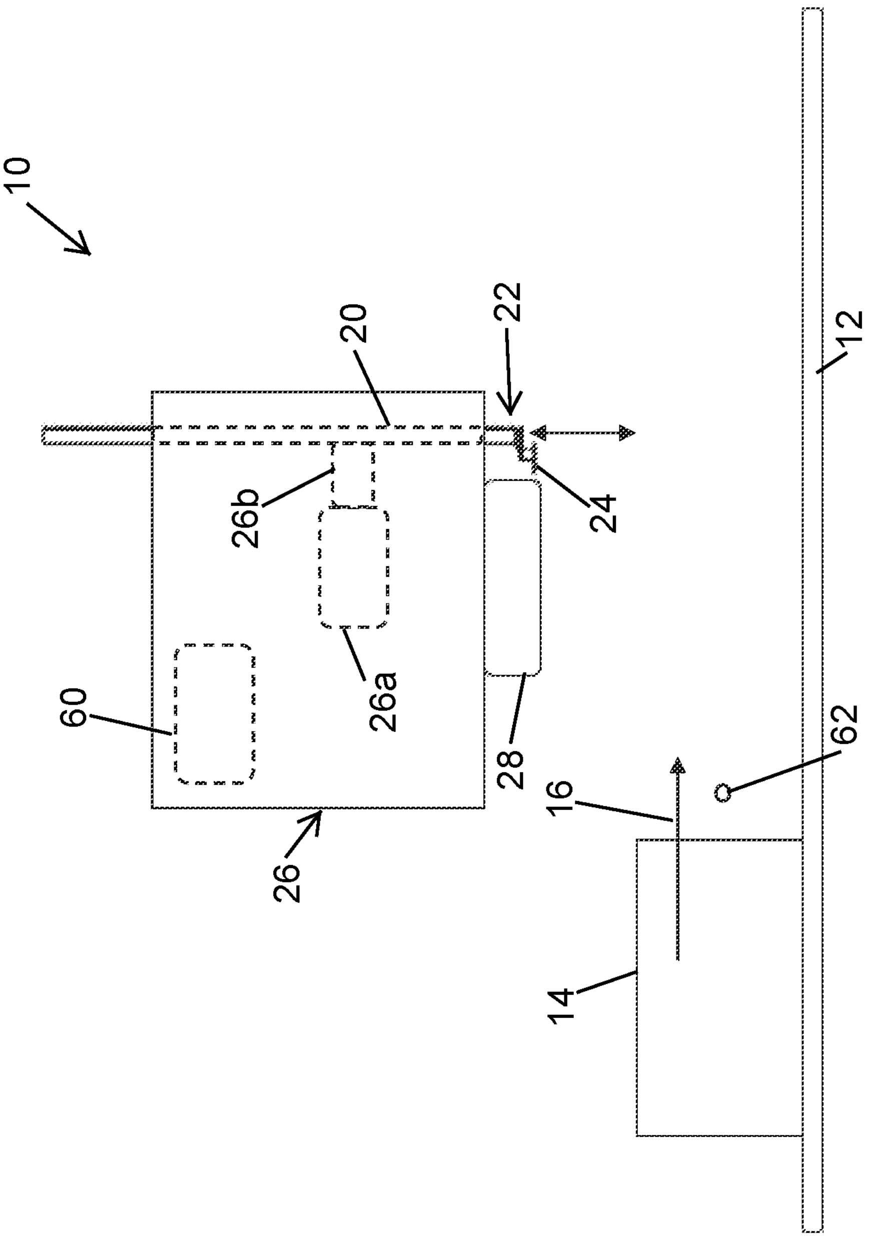
FIG. 1 is a side elevation of a label applying system with a label applying arm in a label receiving position.
Figure 2:
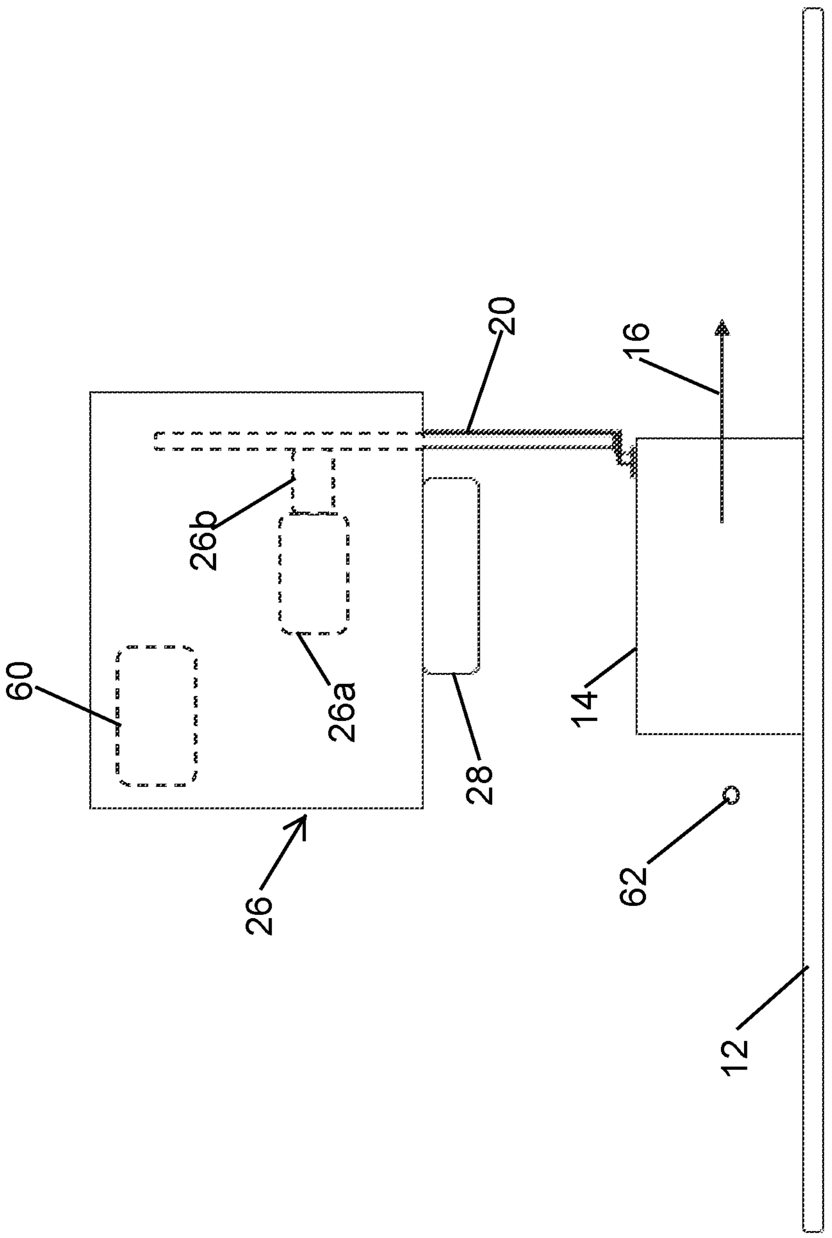
FIG. 2 is a side elevation of the label applying system with the label applying arm moved to a label applying position.
Figure 3:
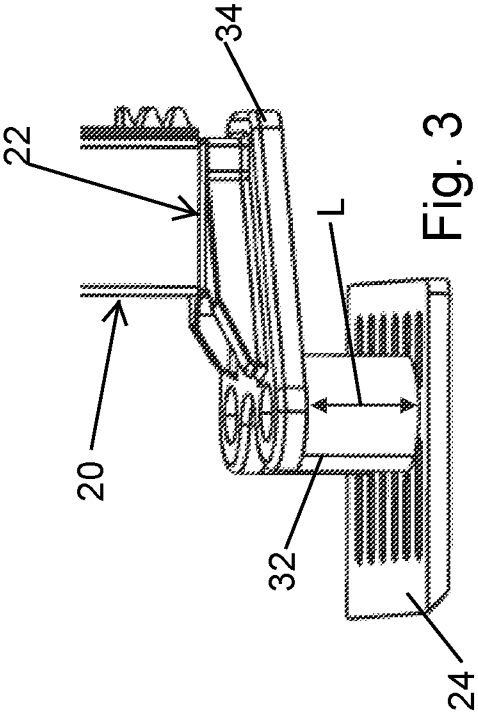
FIGS. 3-6 are partial perspective views of a connection between the tamp pad and the label applying arm.
Figure 4:
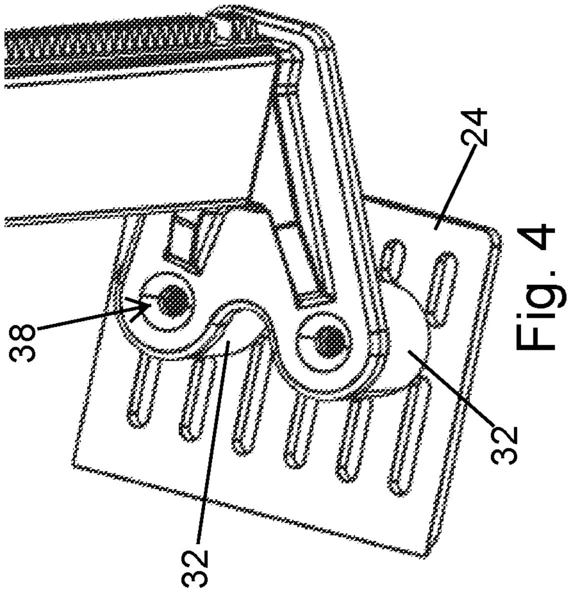
Figure 5:
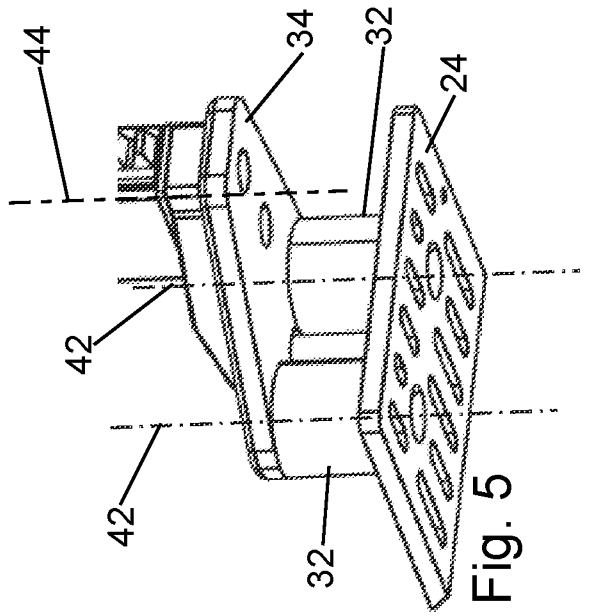
Figure 6:
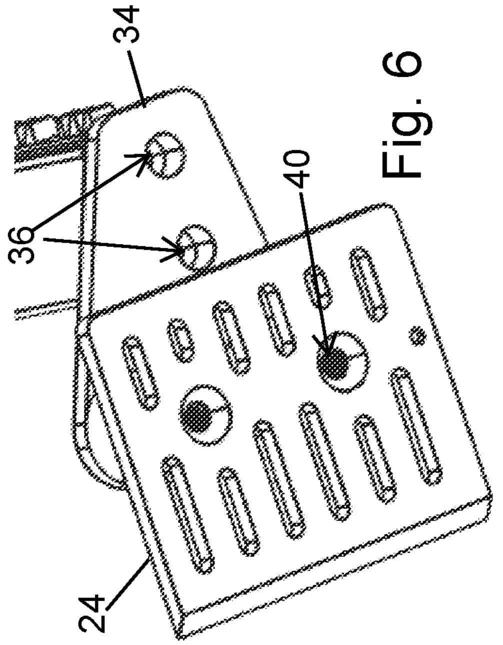

Referring to FIGS. 1-7, a label applying system 10 includes a conveyance path 12 for moving an item 14 in a conveyance direction 16. A label applying arm 20 includes a free end 22 with an associated tamp pad 24. The label applying arm 20 is linearly movable toward and away from the conveyance path 12 for applying a label to the moving item 14 on the conveyance path. The label applying arm is mounted to a label applying mechanism 26 that includes an associated drive (e.g., motor **26*a* and geared, belt or chain connection 26*c*) for the arm 20. A label print and dispense unit 28 feeds the label laterally onto the downward facing surface of the tamp pad 24. Movement of the arm 20 may be controlled by sensing position of the moving item 14 (e.g., using cross-conveyor photo-detectors 62, or other sensors) to trigger downward movement of the arm, and sensing movement or position of the arm 20 to trigger upward movement of the arm. More specifically, in one embodiment, when the tamp pad 24 contacts the moving item, a slow-down in the movement the arm 20 is detected (i.e., arm position changes by a much smaller value over a given time period) and used to trigger a return upward movement of the arm. In other embodiments, a reaction force on the arm 20 may, for example, be sensed by monitoring a load seen by the arm drive motor, in order to trigger a return upward movement of the arm. The system includes a controller 60** operatively connected with the motor/drive and sensor(s) and configured for such operations. As used herein, the term controller is intended to broadly encompass any circuit (e.g., solid state, application specific integrated circuit (ASIC), an electronic circuit, a combinational logic circuit, a field programmable gate array (FPGA)), processor(s) (e.g., shared, dedicated, or group—including hardware or software that executes code), software, firmware and/or other components, or a combination of some or all of the above, that carries out the control functions of the device or the control functions of any component thereof.

A connection 30 between the tamp pad 24 and the label applying arm 20 includes at least one rubber damper 32 running between the tamp pad 24 and the label applying arm 20 for enabling pivot of the tamp pad 24 and absorbing impact force when the tamp pad 24 contacts the moving item to apply the label to the moving item. Here, two rubber dampers 32 are provided and are spaced apart from one another. The connection 30 includes a structural plate 34 rigidly connected (e.g., by bolts or other fasteners 36) to the free end 22 of the label applying arm 20, with the rubber dampers interconnecting the structural plate 34 and the tamp pad 24. Here, each rubber damper 32 has an upper end rigidly connected to the structural plate (e.g., by bolts or other fasteners 38) and a lower end rigidly connected to the tamp pad 24 (e.g., by bolts or other fasteners 40). Each rubber damper 32 includes a respective axis 42 that is axially offset from an axis 44 of the label applying arm 20, with the two axes 42 being substantially parallel to each other and substantially parallel to the axis 44. Notably, here, a plane 50 in which both the axes 42 lie runs substantially perpendicular to the conveyance direction 16 and is offset from the axis 44 of the arm 20.

Figure 7:
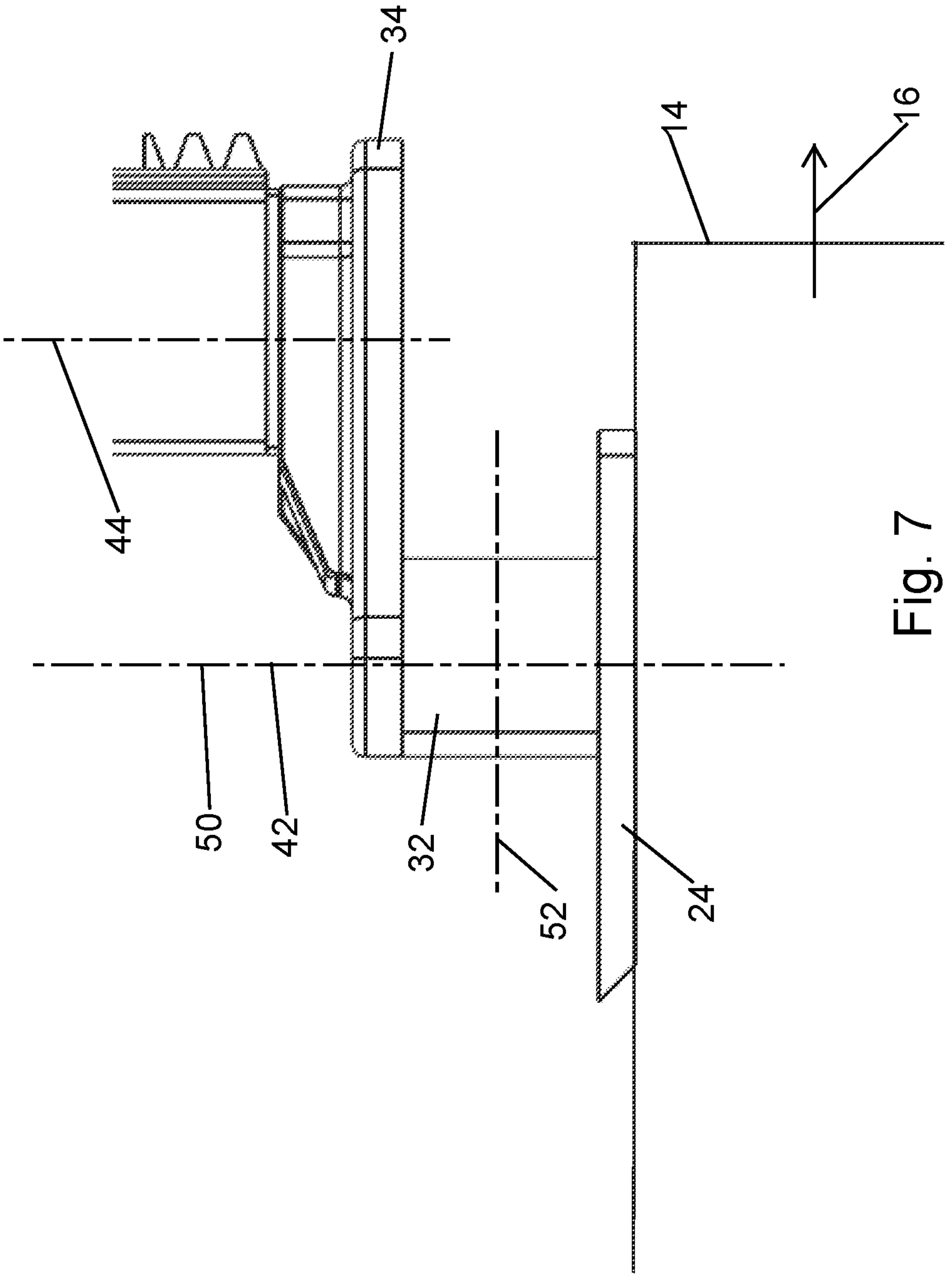
FIG. 7 is an enlarged partial side elevation showing the tamp pad applying a label to a substantially horizontal surface of an item.

As seen in FIG. 7, the rubber dampers 32 have limited axial compression even upon contact of the tamp pad 24 with an item. By way of example, each rubber damper may be configured such that it will axially compress no more than about fifteen percent (e.g. no more than about 10%, such as 0.10 inches for a damper having a resting axial length L of 1.0 inch) when an axial compression force of 55 pounds is applied to the rubber damper. In one implementation, each rubber damper 32 is formed of a rubber material having a durometer of between 40 A and 60 A (e.g., between 45 A and 55 A, such as about 50 A). In one implementation, each rubber damper comprises a cylindrical damper, when the damper is in its unaffected, rest state (i.e., no forces applied to the damper).

Figure 8:
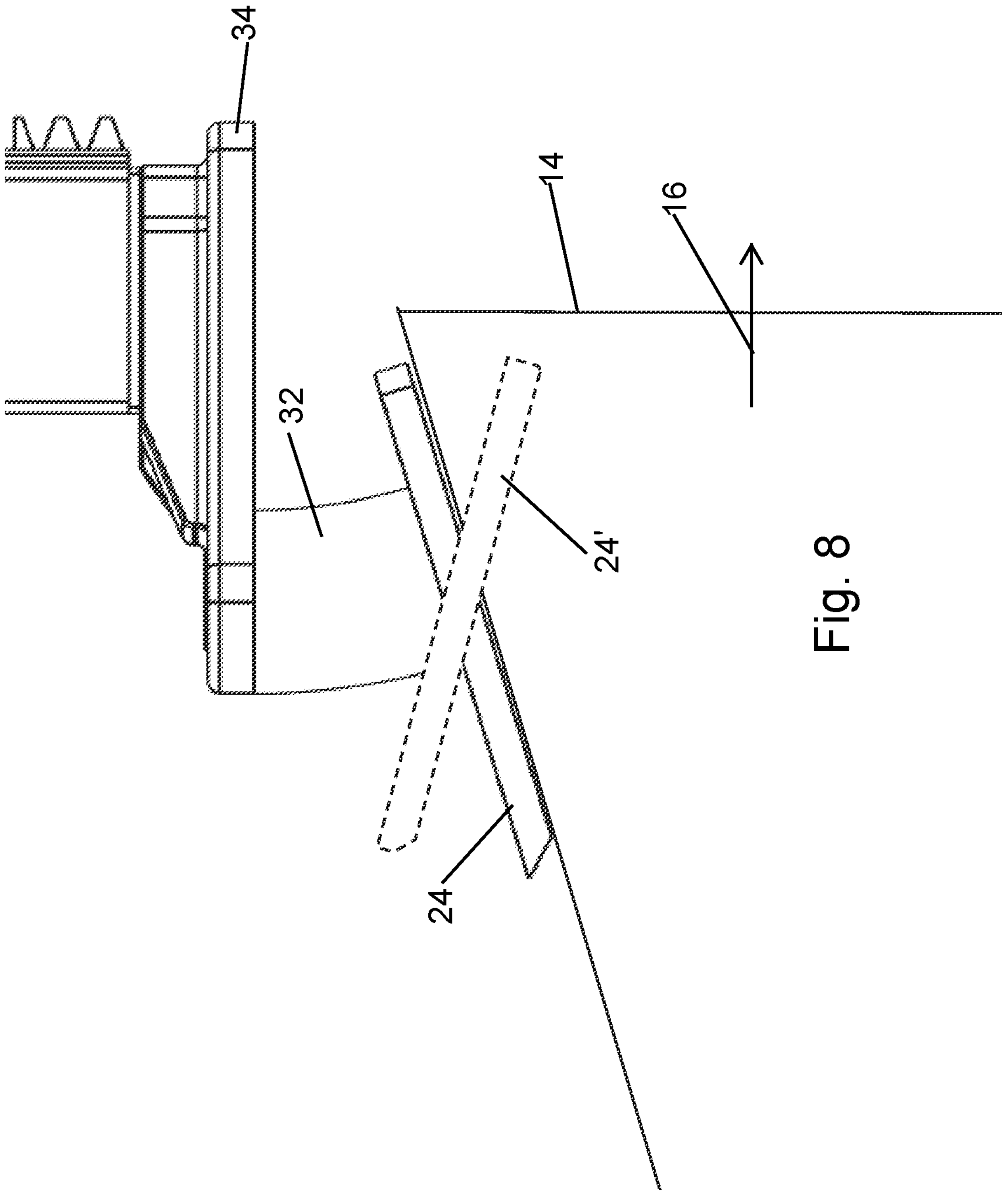
FIG. 8 is an enlarged partial side elevation showing the tamp pad applying a label to an item surface that is offset from horizontal.

As seen in FIG. 8, a shape of each rubber damper 32 changes when the tamp pad 24 pivots due to contact with an item surface. In particular, the rubber dampers bend, in a curved manner, when the tamp pad pivots. Per FIG. 8, pivot of the tamp pad 24 in an opposite direction is also possible, per tamp pad position 24' shown in dashed line form. In embodiments having two dampers 32 positioned as shown, the ability of the tamp pad 24 to pivot about an axis 52 that runs perpendicular to the plane 50 would be less than the pivot shown in FIG. 8.

In some embodiments, a combined total mass of all rubber dampers, in this case two, that interconnect the label applying arm to the tamp pad is less than 1.30 ounces (e.g., less than 1.15 ounces).

In some embodiments, a combined total energy dissipation capacity of all rubber dampers, in this case two, that interconnect the label applying arm to the tamp pad is at least 0.6 Joules (e.g., at least 0.8 Joules, such as at least 1.0 Joules or at least 1.2 Joules). Desirably, the combined total energy dissipation capacity of all the rubber dampers will be less than the kinetic energy of the mass consisting of the moving arm and tamp pad assembly, when moving at its constant downward operating speed toward an item for label apply.

In alternative embodiments, the label applying arm may be mounted so as to move horizontally, inward toward the conveyance path and outward away from the conveyance path, for the purpose of applying labels to a side panel of a moving item.

The foregoing is provided for purposes of illustrating, explaining, and describing embodiments of labeling apparatus. Modifications and adaptations to these embodiments will be apparent to those skilled in the art and may be made without departing from the scope or spirit of this application.

The invention claimed is:

1. A label applying system, comprising:

a conveyance path for moving an item in a conveyance direction;

a label applying arm, including a free end with an associated tamp pad, the label applying arm linearly movable toward the conveyance path for applying a label to the moving item on the conveyance path;

wherein a connection between the tamp pad and the label applying arm comprises at least one rubber damper between the tamp pad and the label applying arm for enabling pivot of the tamp pad and for absorbing impact force when the tamp pad contacts the moving item to apply the label to the moving item.

2. The label applying system of claim 1, wherein the connection comprises a structural plate rigidly connected to the free end of the label applying arm, and the at least one rubber damper interconnects the structural plate and the tamp pad.

3. The label applying system of claim 2, wherein the at least one rubber damper includes a first end rigidly connected to the structural plate and a second end rigidly connected to the tamp pad.

4. The label applying system of claim 2, wherein the at least one rubber damper comprises a first rubber damper interconnecting the structural plate and the tamp pad and a second rubber damper interconnecting the structural plate and the tamp pad, the second rubber damper spaced apart from the first rubber damper.

5. The label applying system of claim 4, wherein an axis of each rubber damper is axially offset from an axis of the label applying arm.

6. The label applying system of claim 4, wherein the first rubber damper includes a first central axis, wherein the second rubber damper includes a second central axis substantially parallel to the first central axis, wherein a plane in which both the first central axis and the second central axis lie runs substantially perpendicular to the conveyance direction.

7. The label applying system of claim 1, wherein a shape of the at least one rubber damper changes when the tamp pad pivots.

8. The label applying system of claim 7, wherein the at least one rubber damper bends when the tamp pad pivots.

9. The label applying system of claim 1, wherein the at least one rubber damper comprises a cylindrical damper.

10. The label applying system of claim 1, wherein the at least one rubber damper is formed of a rubber material having a durometer of between 40 A and 60 A.

11. The label applying system of claim 1, wherein the at least one rubber damper is configured such that it will axially compress no more than 15%.

12. The label applying system of claim 1, wherein a total mass of all rubber dampers that interconnect the label applying arm to the tamp pad is less than 1.30 ounces.

13. The label applying system of claim 1, wherein the label applying arm is moved toward the conveyance path at a set operating speed and a total energy dissipation capacity of all rubber dampers that interconnect the label applying arm to the tamp pad is at least as great as a kinetic energy of the moving label applying arm.

14. A label applying system, comprising:

a label applying arm, including a free end with an associated tamp pad, the label applying arm having a length and being linearly movable in a direction along the length for applying labels;

wherein a connection between the tamp pad and the label applying arm comprises at least one rubber damper between the tamp pad and the label applying arm for enabling pivot of the tamp pad when the tamp pad contacts the moving item to apply the label to the moving item.

15. The label applying system of claim 14, wherein the connection comprises a structural plate rigidly connected to the free end of the label applying arm, the at least one rubber damper interconnecting the structural plate and the tamp pad.

16. The label applying system of claim 15, wherein the at least one rubber damper includes a first end rigidly connected to the structural plate and a second end rigidly connected to the tamp pad.

17. The label applying system of claim 14, wherein an axis of the at least one rubber damper is axially offset from an axis of the label applying arm.

18. The label applying system of claim 14, wherein the at least one rubber damper bends when the tamp pad pivots.

19. The label applying system of claim 1, wherein the at least one rubber damper is formed of a rubber material having a durometer of between 45 A and 55 A.

20. The label applying system of claim 14, wherein the label applying arm is moved at a set operating speed and a total energy dissipation capacity of all rubber dampers that interconnect the label applying arm to the tamp pad is at least as great as a kinetic energy of the moving label applying arm.

* * * * *